United States Patent [19]

Occelli

[11] Patent Number: 4,803,060
[45] Date of Patent: Feb. 7, 1989

[54] PROCESS FOR PRODUCING A CRYSTALLINE GALLIOSILICATE WITH THE FAUJASITE STRUCTURE

[75] Inventor: Mario L. Occelli, Yorba Linda, Calif.

[73] Assignee: Union Oil Company of California, Los Angeles, Calif.

[21] Appl. No.: 936,731

[22] Filed: Dec. 1, 1986

[51] Int. Cl.$^4$ .......................... C01B 33/20; B01J 29/04
[52] U.S. Cl. ...................................... 423/326; 502/61; 423/624
[58] Field of Search ..................... 502/61, 79; 423/326, 423/328, 329, 333, 624

[56] References Cited

U.S. PATENT DOCUMENTS

| | | | |
|---|---|---|---|
| 3,130,007 | 4/1964 | Breck | 423/329 |
| 3,431,219 | 3/1969 | Argauer | 423/328 |
| 3,639,099 | 2/1972 | Elliott, Jr. et al. | 423/329 |
| 4,178,352 | 12/1979 | Vaughan et al. | 423/328 |
| 4,340,573 | 7/1982 | Vaughan et al. | 423/329 |
| 4,608,236 | 8/1986 | Strack et al. | 502/79 |
| 4,631,262 | 12/1986 | Altomare | 423/328 |
| 4,678,651 | 7/1987 | Miyazaki et al. | 423/329 |

FOREIGN PATENT DOCUMENTS

0140314  8/1982  Japan ................. 423/328 C

OTHER PUBLICATIONS

Vaughan et al. (I), "Intrazeolite Chemistry", Stucky et al. Ed., pp. 231–242, 1982.
J. Selbin and R. B. Mason, "Preparation of Gallium–Containing Molecular Sieves," *J. Inorg. Nucl. Chem.*, vol. 20, 1961, pp. 222–228.
K. Suzuki, Y. Kiyozumi, S. Shin and S. Ueda, "Synthesis of New Gallosilicate Zeolite with Sodalite Structure," *Zeolites*, vol. 5, 1985, pp. 11–14.
J. M. Newsam, D. E. W. Vaughan, "Structural Studies of Gallosilicate Zeolites," *New Developments in Zeolite Science and Technology*, Proceedings of the 7th International Zeolite Conference, Tokyo, 1986, pp. 457–464.

Primary Examiner—John Doll
Assistant Examiner—R. Bruce Breneman
Attorney, Agent, or Firm—Yale S. Finkle; Gregory F. Wirzbicki

[57] ABSTRACT

A crystalline, galliosilicate molecular sieve having the faujasite structure is synthesized by mixing a hydrogel having the following oxide mole ratios of components:
  $SiO_2/Ga_2O_3 = 6$ to 15
  $Na_2O/Ga_2O_3 = 1$ to 5
  $H_2O/Ga_2O_3 = 80$ to 500
with a clear galliosilicate solution having the following oxide mole ratios of components:
  $SiO_2/Ga_2O_3 = 5$ to 30
  $Na_2O/Ga_2O_3 = 6$ to 20
  $H_2O/Ga_2O_3 = 200$ to 800
to form a mixture. The resultant mixture is then crystallized without stirring at a temperature below about 150° C. to form the galliosilicate molecular sieve with the faujasite structure.

23 Claims, 4 Drawing Sheets

PROCESS FOR PRODUCING A CRYSTALLINE GALLIOSILICATE WITH THE FAUJASITE STRUCTURE

BACKGROUND OF THE INVENTION

This invention relates to crystalline galliosilicates and is particularly concerned with a method for producing a crystalline galliosilicate molecular sieve having the faujasite structure.

Zeolites are well known natural and synthetic molecular sieves that can be defined as crystalline, three-dimensional aluminosilicates consisting essentially of alumina and silica tetrahedra which interlock to form discrete polyhedra. The polyhedra are interconnected to form a framework which encloses cavities or voids interconnected by channels or pores. The size of the cavities and pores will vary depending on the framework structure of the particular zeolite. Normally, the cavities are large enough to accommodate water molecules and large cations which have considerable freedom of movement, thereby permitting sorption, reversible dehydration and ion exchange. The dimensions of the cavities and pores in a zeolite are limited to a small number of values and can vary from structure to structure. Thus, a particular zeolite is capable of sorbing molecules of certain dimensions while rejecting those of dimensions larger than the pore size associated with the zeolite structure. Because of this property zeolites are commonly used as molecular sieves.

In addition to their molecular sieving properties, zeolites show a pronounced selectivity toward polar molecules and molecules with high quadrupole moments. This is due to the ionic nature of the crystals which gives rise to a high nonuniform electric field within the micropores of the zeolite. Molecules which can interact energetically with this field, such as polar or quadrupolar molecules, are therefore sorbed more strongly than nonpolar molecules. This selectivity toward polar molecules is the unique property of zeolites which allows them to be used as drying agents and selective sorbents.

In addition to their use as drying agents and selective sorbents, zeolites are widely used as components of chemical conversion catalysts. As found in nature or as synthesized, zeolites are typically inactive because they lack acid sites. In general, acid sites are created by subjecting the zeolite to an ion exchange with ammonium ions followed by some type of thermal treatment which creates acid sites by decomposing the ammonium ions into gaseous ammonia and protons. Activated zeolites have been used in many types of chemical conversion processes with the smaller pore zeolites being used to selectively sorb and crack normal and moderately branched chain paraffins.

Because of the unique properties of zeolitic molecular sieves, there have been many attempts at synthesizing new molecular sieves by either substituting an element for the aluminum or silicon present in zeolitic molecular sieves or adding another element in addition to the aluminum and silicon. The term "zeolitic" as used herein refers to molecular sieves whose frameworks are formed of substantially only silica and alumina tetrahedra. One such class of new molecular sieves that has been created is that in which all the framework aluminum has been replaced by gallium. Specifically, it has been reported in U.S. Pat. No. 3,431,219 and in an article entitled "Preparation of Gallium-Containing Molecular Sieves," authored by J. Selbin and R. B. Mason and published at pages 222 through 228 in volume 20 of the *Journal of Inorganic Nuclear Chemistry* that galliosilicate molecular sieves having the faujasite structure have been synthesized. The synthesis processes disclosed in both of these cited references are undesirable for several reasons. The process disclosed by the patent for making a galliosilicate containing essentially no aluminum and having the faujasite structure requires an aging step, followed by a digestion step, followed by a step in which the gel is separated from the mother liquor and then subsequently mixed with sodium hydroxide so that the resulting crystallization mixture has a pH of from about 10 to 14. The crystallization mixture is then digested for about 1 to 7 days to form the desired crystals of sodium galliosilicate having the faujasite structure. The step of separating the gel from the mother liquor is quite undesirable since it results in significant added costs to the synthesis process. The process disclosed by the Selbin and Mason article involves the addition of attetrachlorogallate solution to an alkaline sodium metasilicate solution at room temperature and then subsequent heating at 70° C. with vigorous stirring for 20 to 22 hours. This process is undesirable because it requires the use of expensive tetrachlorogallate and results only in molecular sieves which have silica-to-gallia ratios below 3. In view of the foregoing, it is clear that a simple process utilizing inexpensive reactants to produce galliosilicate molecular sieves with the faujasite structure and having a wide range of silica-to-gallia ratios is desirable.

Accordingly, it is one of the objects of the present invention to provide a relatively simple process for synthesizing crystalline, galliosilicate molecular sieves having the faujasite structure and a wide range of silica-to-gallia ratios, which sieves may be useful in many types of chemical conversion processes, particularly hydrocarbon conversion processes. This and other objects of the invention will become more apparent in view of the following description of the invention.

SUMMARY OF THE INVENTION

In accordance with the invention, it has now been found that a crystalline, galliosilicate molecular sieve comprising silicon, gallium and oxygen and having the faujasite crystal structure can be synthesized by mixing a source of gallia, a source of silica, a source of sodium and water to form a hydrogel in which the components have the following oxide mole ratios:

$SiO_2/Ga_2O_3 = 6$ to 15
$Na_2O/Ga_2O_3 = 1$ to 5
$H_2O/Ga_2O_3 = 80$ to 500

After the above-described hydrogel is formed, it is mixed with a clear galliosilicate solution prepared in the same manner as the hydrogel, i.e., by mixing a source of gallia, a source of silica, a source of sodium and water, except that the mole ratio of $Na_2O$-to-$Ga_2O_3$ is sufficiently large to prevent gel formation, or, if a gel does form, to facilitate dissolution of the gel upon vigorous stirring. The components comprising the solution are typically present in the following oxide mole ratios:

$SiO_2/Ga_2O_3 = 5$ to 30
$Na_2O/Ga_2O_3 = 6$ to 20
$H_2O/Ga_2O_3 = 200$ to 800

After the solution is added to the hydrogel, the mixture is crystallized without stirring at a temperature below about 150° C. to form a crystalline, galliosilicate molecular sieve having the faujasite structure. This molecular sieve typically has the composition, expressed in terms of oxide mole ratios in the anhydrous state, of:

$$Ga_2O_3:xSiO_2:yNa_2O$$

where x equals 2.5 to 7 and y equals about 1.0.

DETAILED DESCRIPTION OF THE INVENTION

Figure 1:
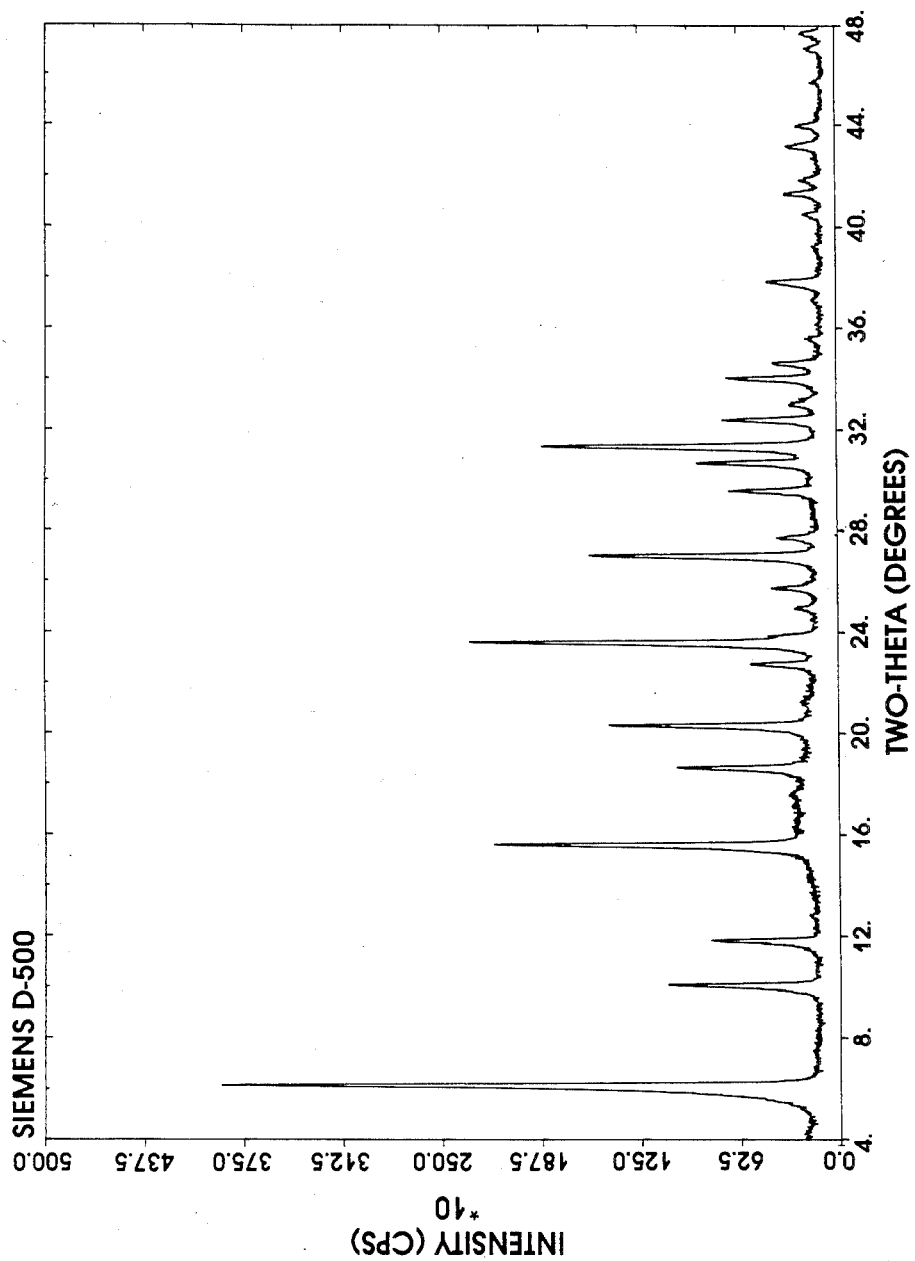
FIG. 1 in the drawing shows the X-ray powder diffraction pattern of a zeolite with the faujasite structure.

A crystalline, galliosilicate molecular sieve having the faujasite structure is prepared by crystallizing a mixture of a hydrogel and a galliosilicate solution, both of which are separately formed by mixing a source of gallia, a source of silica, and a source of sodium with water under conditions such that the various components react to form, respectively, the desired hydrogel and the desired solution. The crystallization is carried out in the absence of an organic templating agent. Since a source of alumina is not used in forming either the hydrogel or the solution, the only alumina present in the crystallized galliosilicate will be alumina impurities in the source materials. Thus, the galliosilicate molecular sieve formed upon crystallization will normally contain less than about 0.2 weight percent alumina, preferably less than 0.05 weight percent, and will usually be substantially free of alumina.

The silica used in forming the hydrogel and galliosilicate solution may be in the form of sodium silicate, silica hydrosols, silica gels, silica salts and reactive amorphous solid silicas. The source of the silica can be in either the liquid or solid state. Examples of reactive, amorphous solid silicas that may be used include fumed silicas, chemically precipitated silicas, and precipitated silica sols usually having a particle size of less than 1 micron in diameter. The preferable sources of silica are sodium silicates (water glass) and aqueous colloidal solutions of silica particles.

The source of sodium used in forming the hydrogel and the galliosilicate solution may be a sodium salt or sodium hydroxide. It is possible for the source of sodium to also be the source of gallia utilized to form the hydrogel and the galliosilicate solution. Sodium gallates are examples of materials which serve as a source of both sodium and gallia.

The gallia used to produce the hydrogel and the clear solution may be in the form of gallium oxide, gallium hydroxide, an alkali metal gallate or an inorganic gallium salt, such as gallium nitrate, gallium sulfate, and gallium acetate. As mentioned above, the source of the gallia may also be the source of sodium required to form the hydrogel and the galliosilicate solution. In fact, a preferred source of gallia is prepared by dissolving gallium oxide in an aqueous solution of sodium hydroxide to form sodium gallate which is then used as a component to form the hydrogel and the galliosilicate solution.

The hydrogel used to form the mixture from which a galliosilicate molecular sieve with the faujasite structure is crystallized is normally prepared by first dissolving the source of gallia in an aqueous solution of sodium hydroxide. The resulting solution is then mixed with a source of silica to form a hydrogel which is vigorously stirred. A sufficient amount of the gallia source, the silica source, the sodium source and water is used so that the resultant hydrogel contains the following oxide mole ratios of components:

$SiO_2/Ga_2O_3 = 6$ to 15, preferably 8 to 12
$Na_2O/Ga_2O_3 = 1$ to 5, preferably 2.5 to 4.5
$H_2O/Ga_2O_3 = 80$ to 500, preferably 100 to 200

The galliosilicate solution that is added to the hydrogel to form the crystallization mixture is substantially free of dispersed particles and is typically prepared in a manner similar to that used in preparing the hydrogel. A source of gallia is dissolved in aqueous sodium hydroxide and the resulting solution is mixed with a silica source. A sufficient amount of the gallia source, the silica source, the sodium source and water is used so that the resultant mixture contains the following oxide mole ratios of components:

$SiO_2/Ga_2O_3 = 5$ to 30, preferably 10 to 20
$Na_2O/Ga_2O_3 = 6$ to 20, preferably 8 to 15
$H_2O/Ga_2O_3 = 200$ to 800, preferably 300 to 500

Generally, a sufficient amount of the sodium source is used so that the $Na_2O$-to-$Ga_2O_3$ ratio is such that a gel is not formed when the components are mixed together or, if a gel is formed upon the mixing of the components, it can be forced into solution by stirring at ambient temperature.

After the hydrogel and the galliosilicate solution have been separately prepared, a sufficient amount of the solution is added to the hydrogel so that the resultant mixture, which remains in a gel form, contains between about 1 and about 40 weight percent of the solution, preferably between about 10 and about 30 weight percent. Normally, the oxide mole ratio of components in the resultant mixture will fall within the same ranges as the oxide mole ratio of components in the starting hydrogel. The mixture is then stirred at atmospheric pressure and at a temperature between about 20° C. and about 150° C., preferably at about ambient temperature, for from about 1 hour to about 2 days, preferably between about 1 hour and about 10 hours. After stirring, the mixture is crystallized by heating in the absence of stirring or agitation for between about 1 day and 10 days at a temperature in the range between about 70° C. and 150° C., preferably between about 90° C. and 110° C. The temperature is normally controlled within the above ranges to avoid the formation of phase impurities. After the mixture has been crystallized, the resulting slurry is passed to a filter, centrifuge or other separation device to remove the excess reactants or mother liquor from the crystallized molecular sieve. The crystals are then washed with water and dried at a temperature between about 50° C. and about 200° C. to remove surface water.

The dried crystals produced as described above will normally have the following composition expressed in terms of oxide mole ratios in the anhydrous state:

$$Ga_2O_3:xSiO_2:yNa_2O$$

where x equals 2.5 to 7, preferably 3 to 6, and y equals about 1.0. The X-ray powder diffraction pattern of the crystallized molecular sieve will typically contain at least the d-spacings set forth in Table 1 below.

TABLE 1

| Bragg Angle 2-Theta (Degrees) | Interplanar d-spacings (Angstroms) | Relative Intensity ($100 \times I/I_o$) |
|---|---|---|
| 5.9–6.2 | 14.967–14.243 | 80–100 |
| 15.4–15.7 | 5.7488–5.7119 | 30–70 |
| 23.3–23.7 | 3.8144–3.7509 | 30–70 |
| 26.7–27.1 | 3.3359–3.2876 | 20–50 |
| 31.0–31.4 | 2.8823–2.8465 | 30–70 |
| 33.7–34.1 | 2.6573–2.6270 | 5–30 |

The X-ray powder diffraction data set forth in Table 1 is characteristic of a molecular sieve having the faujasite structure. For comparison purposes, the X-ray powder diffraction pattern of a synthetic zeolite with the faujasite structure is shown in FIG. 1, and the corresponding X-ray powder diffraction data are set forth in Table 2.

TABLE 2

X-Ray Powder Diffraction Data for a Synthetic Zeolite with the Faujasite Structure

| Bragg Angle 2-Theta (Degrees) | Interplanar d-spacings (Angstroms) | Relative Intensity ($100 \times I/I_o$) |
|---|---|---|
| 6.143 | 14.3764 | 100.0 |
| 10.077 | 8.7705 | 25.4 |
| 11.836 | 7.4707 | 18.2 |
| 14.434 | 6.1318 | 1.1 |
| 15.600 | 5.6759 | 52.3 |
| 18.638 | 4.7571 | 21.7 |
| 20.316 | 4.3677 | 33.6 |
| 21.110 | 4.2052 | 1.7 |
| 22.746 | 3.9063 | 10.5 |
| 23.595 | 3.7676 | 57.0 |
| 24.950 | 3.5660 | 3.7 |
| 25.734 | 3.4591 | 7.5 |
| 26.990 | 3.3009 | 37.2 |
| 27.720 | 3.2156 | 6.4 |
| 29.576 | 3.0179 | 14.3 |
| 30.695 | 2.9104 | 17.9 |
| 31.338 | 2.8521 | 44.6 |
| 32.397 | 2.7612 | 15.6 |
| 33.032 | 2.7096 | 4.4 |
| 34.035 | 2.6320 | 14.6 |
| 34.627 | 2.5884 | 7.4 |
| 35.582 | 2.5211 | 2.9 |
| 37.123 | 2.4199 | 1.6 |
| 37.822 | 2.3768 | 9.1 |
| 39.244 | 2.2939 | 1.4 |
| 40.503 | 2.2254 | 3.2 |
| 41.346 | 2.1819 | 5.7 |
| 41.860 | 2.1563 | 3.0 |
| 43.175 | 2.0936 | 5.4 |
| 43.971 | 2.0576 | 4.0 |
| 45.726 | 1.9826 | 1.8 |
| 47.096 | 1.9281 | 2.6 |

The X-ray powder diffraction data set forth in Table 1 for the crystallized galliosilicate produced in accordance with the process of the invention are based on data obtained using a Siemens D-500 X-ray diffractometer with graphite-crystal monochromatized Cu-K alpha radiation. The peak hegiths I, and their position as a function of 2-theta, where theta is the Bragg angle, were read from the diffractometer output. From this output the relative intensities, $100 \times I/I_o$, where $I_o$ is the intensity of the strongest peak, were read. The interplanar spacings, d, in Angstroms corresponding to the recorded peaks were then calculated in accordance with standard procedures. It will be understood that the peak heights and d-spacings associated with the X-ray powder diffraction pattern of the galliosilicate molecular sieve may vary somewhat depending on heat treatment, unit cell composition, crystal size, and whether the molecular sieve has been exchanged with hydrogen ions or metal cations.

After the synthesized galliosilicate crystals have been washed and dried, they are typically treated in order to render them active for acid catalyzed reactions. This procedure normally comprises exchanging the molecular sieve with ammonium ions, hydrogen ions, polyvalent cations such as rare earth-containing cations, magnesium cations or calcium cations, or a combination of ammonium ions, hydrogen ions, and polyvalent cations, thereby lowering the sodium content to below about 2.0 weight percent, preferably below about 1.0 weight percent and most preferably below about 0.05 weight percent, calculated as $Na_2O$. When reducing the sodium content using an ammonium ion exchange technique, the molecular sieve is typically slurried for 1 to 5 hours at a temperature above ambient temperature but less than about 100° C. in an aqueous solution containing a dissolved ammonium salt, such as ammonium nitrate, ammonium sulfate, ammonium chloride and the like. Ordinarily, to achieve extremely low levels of sodium cations, the ion exchange procedure will be repeated at least twice, and occasionally several times. After the ammonium exchange or other treatment to reduce alkali metal content, the molecular sieve is calcined in air at a temperature between about 400° C. and about 700° C., preferably between about 500° C. and about 600° C., for between about 5 hours and about 15 hours. Calcination after an ammonium exchange serves to decompose the ammonium cations into ammonia, which is driven off during the calcination step, and thereby produce the catalytically active hydrogen form of the galliosilicate molecular sieve.

A crystalline, galliosilicate molecular sieve having the faujasite structure produced in accordance with the process of the invention may be used as a catalyst for converting hydrocarbons and other organic compounds into more valuable reaction products by acid catalyzed reactions, such as alkylation, transalkylation, dealkylation, isomerization, dehydrocyclization, dehydrogenation, hydrogenation, cracking, hydrocracking, dewaxing, hydrodewaxing, oligomerization, aromatization, alcohol conversion reactions, the conversion of syngas to mixtures of hydrocarbons and the like. In utilizing such a galliosilicate as a catalyst in conversion processes as described above, it will normally be combined with a porous, inorganic refractory oxide component, or a precursor thereof, such as alumina, silica, titania, magnesia, zirconia, beryllia, silica-alumina, silica-magnesia, silica-titania, a dispersion of silica-alumina in gamma alumina, a clay such as kaolin, hectorite, sepiolite and attapulgite, combinations of the above and the like. The preferred porous, inorganic refractory oxide component will depend upon the particular conversion process involved and will be well known to those skilled in the art. Examples of precursors that may be used include peptized alumina, alumina gel, hydrated alumina, silica-alumina, hydrogels, Ziegler-derived aluminas and silica sols. The exact amounts of crystalline galliosilicate and porous, inorganic refractory oxide used in the catalyst will again depend upon the particular conversion process in which the catalyst is to be used.

It will be understood that although the primary use of the catalyst will be in hydrocarbon conversion processes to convert hydrocarbon feedstocks into desirable reaction products, the catalyst can also be used to convert feedstocks or organic compounds other than hydrocarbons into desired reaction products. For example, the catalyst can be used to convert alcohols into transportation fuels and to convert gaseous mixtures of carbon monoxide and hydrogen into hydrocarbons. As used herein "hydrocarbon" refers to any compound which comprises hydrogen and carbon and "hydrocarbon feedstock" refers to any charge stock which contains a mixture of hydrocarbon compounds and comprises greater than about 70 weight percent carbon and hydrogen, preferably greater than about 80 weight percent, calculated as the elements.

Depending on the particular type of conversion process in which the catalyst containing a galliosilicate molecular sieve with the faujasite structure is to be used, it may be desirable that the catalyst also contain a metal promoter or combination of metal promoters selected from Group IB, Group IIB, Group IIIA, Group IVA, Group VA, Group VIB, Group VIIB or Group VIII of the Periodic Table of Elements. As used herein "Periodic Table of Elements" refers to the version found in the inside front cover of the "Handbook of Chemistry and Physics," 65th Edition, published in 1984 by the Chemical Rubber Company, Cleveland, Ohio. Specific metal components which may be used as promoters include components of copper, silver, zinc, aluminum, gallium, indium, thallium, lead, tin, antimony, bismuth, chromium, molybdenum, tungsten, manganese, iron, cobalt, nickel, ruthenium, rhodium, palladium, iridium, platinum, rhenium, thorium and the rare earths. These metal promoters may be ion exchanged into the crystalline galliosilicate itself, they may be incorporated into the mixture of the crystalline galliosilicate and the porous, inorganic refractory oxide, or they may be added by impregnation after the catalyst particles have been formed.

The catalyst is normally prepared by mulling a crystalline galliosilicate molecular sieve produced in accordance with the process of the invention in powder form with the porous, inorganic refractory oxide component. If desired, a binder such as peptized Catapal alumina may be incorporated into the mulling mixture, as also may be one or more active promoter metal precursors. After mulling, the mixture is extruded through a die having openings of a cross sectional size and shape desired in the final catalyst particles. For example, the die may have circular openings to produce cylindrical extrudates, openings in the shape of three-leaf clovers so as to produce an extrudate material similar to that shown in FIGS. 8 and 8A of U.S. Pat. No. 4,028,227, the disclosure of which is hereby incorporated by reference in its entirety, or openings in the shape of fourleaf clovers. Among preferred shapes for the die openings are those that result in particles having surface-to-volume ratios greater tha about 100 reciprocal inches. If the die opening is not circular in shape, it is normally desirable that the opening be in a shape such that the surface-tovolume ratio of the extruded particles is greater than that of a cylinder. After extrusion, the catalyst particles are broken into lengths of from 1/16 to ½ inch and calcined in air at a temperature of at least 750° F., usually between about 800° F. and about 1200° F., and preferably in the range between about 900° F. and 1050° F.

As mentioned previously, metal promoter components may be mulled, either as a solid or liquid, with a galliosilicate prepared in accordance with the process of the invention and the porous, inorganic refractory oxide component to form the catalyst extrudates prior to the calcination step. Alternatively, the metal promoter component or components may be added to the catalyst by impregnation after the calcination step. The metal promoter component or components may be impregnated into the calcined extrudates from a liquid solution containing the desired metal promoter component or components in dissolved form. In some cases, it may be desirable to ion exchange the calcined extrudates with ammonium ions prior to adding the metal promoter component or components. After the calcined extrudates have been impregnated with the solution containing the metal promoter component or components, the particles are dried and calcined in the air at a temperature normally ranging between about 800° F. and about 1100° F. to produce the finished catalyst particles.

In addition to a crystalline, galliosilicate molecular sieve having the faujasite structure, the catalyst may also contain other molecular sieves such as aluminosilicates, borosilicates, aluminophosphates, silicoaluminophos phates, naturally occurring zeolites, pillared clays and delaminated clays. Suitable aluminosilicates for combining with a crystalline galliosilicate include Y zeolites, ultrastable Y zeolites, X zeolites, zeolite beta, zeolite L, faujasite and zeolite omega. The actual molecular sieve used in combination with a crystalline galliosilicate will depend upon the particular conversion process in which the resultant catalyst is to be used. The molecular sieve of choice is normally incorporated into the catalyst by mixing the molecular sieve with a crystalline galliosilicate and porous, inorganic refractory oxide prior to mulling and extrusion.

It is typically preferred to use catalysts containing a crystalline galliosilicate molecular sieve synthesized in accordance with the process of the invention as a cracking catalyst in the absence of added hydrogen or in hydroconversion processes such as hydrodenitrogenation, hydrodesulfurization, hydrocracking and isomerization. When used in hydroconversion processes, the catalyst will normally contain hydrogenation components comprising metals selected from Group VIII and/or Group VIB of the Periodic Table of Elements. These hydrogenation metal components are incorporated into the catalyst extrudates either prior to or after extrusion. Examples of Group VIII and Group VIB metal components that may be used include nickel, cobalt, tungsten, molybdenum, palladium and platinum components. In some cases, it may be desirable that the catalyst contain at least one Group VIII metal component and at least one Group VIB metal component. When this is the case, the preferred combination is a nickel and/or cobalt component with a molybdenum and/or tungsten component.

If the hydrogenation metal component consists essentially of a noble metal such as platinum or palladium, it is generally desired that the finished catalyst particles contain between about 0.05 and about 10 weight percent of the hydrogenation metal component, preferably between about 0.10 weight percent and about 3.0 weight percent, calculated as the metal. If on the other hand, the hydrogenation metal component consists essentially of one or more non-noble metals, such as nickel or nickel and tungsten, it is normally desired that the finished catalyst particles contain between about 1.0 and about 40 weight percent of the hydrogenation metal components, preferably between about 3 weight percent and about 30 weight percent, calculated as the metal oxide.

Feedstocks that may be subjected to hydroconversion processes using a catalyst containing a galliosilicate synthesized in accordance with the process of the invention include mineral oils, synthetic oils, such as shale oil, oil derived from tar sands and coal liquids, and the like. Examples of appropriate feedstocks for hydroconversion processes include straight run gas oils, vacuum gas oils and catalytic cracker distillates. Preferred hydroconversion feedstocks include gas oils and other hydrocarbon fractions having at least about 50 weight percent of their components boiling above about 700° F.

In general, the temperature at whic the hydroconversion process takes place is between about 450° F. and about 850° F., preferably between about 600° F. and about 800° F. The pressure will normally range between about 750 and about 3500 p.s.i.g., preferably between about 1000 and about 3000 p.s.i.g. The liquid hourly space velocity (LHSV) is typically between about 0.3 and about 5.0, preferably between about 0.5 and about 3.0. The ratio of hydrogen gas to feedstock utilized will usually range between about 1000 and about 10,000 scf/bbl, preferably between about 2000 and about 8000 scf/bbl as measured at 60° F. and one atmosphere.

The nature and objects of the invention are further illustrated by the following examples, which are provided for illustrative purposes only and not to limit the invention as defined by claims. The examples demonstrate a simple method of synthesizing a crystalline galliosilicate with the faujasite structure and show that a controlled crystalization temperature and the absence of stirring during crystallization are necessary to ensure that the faujasite structure is obtained.

EXAMPLE 1

A sodium gallate solution is prepared by mixing in a glass beaker gallium oxide of a 99.99% purity with an aqueous solution of sodium hydroxide made by dissolving commercial grade sodium hydroxide crystals in distilled water. The mixture of gallium oxide and sodium hydroxide is vigorously stirred under boiling conditions until the gallium oxide is completely dissolved. After stirring, Ludox HS-40, a silica sol solution manufactured and sold by the DuPont Chemical Company, is added dropwise to a portion of the stirred mixture to form a hydrogel. The resultant hydrogel is stirred at room temperature until the gel passes into solution generating a clear liquid galliosilicate solution having the following composition expressed in terms of oxide mole ratios:

$Ga_2O_3$:15 $SiO_2$:10 $Na_2O$:400 $H_2O$

In a second glass beaker, Ludox HS-40 silica sol solution is added dropwise to a portion of the sodium gallate solution that was prepared in the first beaker to form a hydrogel with the following composition expressed in terms of oxide mole ratios:

$Ga_2O_3$:9.44 $SiO_2$:3.3 $Na_2O$:122 $H_2O$

After the hydrogel is formed, a sufficient amount of the galliosilicate solution prepared in the first container is added to the second container so that the resultant mixture has the following composition expressed in terms of oxide mole ratios:

$Ga_2O_3$:10 $SiO_2$:4.0 $Na_2O$:150 $H_2O$

The mixture of the hydrogel and the galliosilicate solution, which is itself a gel, is then stirred at ambient temperature for about 2 hours after which the temperature is slowly raised to about 95° C. to 100° C. At this point stirring is terminated and the mixture is allowed to crystallize without stirring or agitation. After about 48 hours the hydrogel is transformed into a crystalline material. The resulting crystals are washed with hot distilled water to remove excess reactants and then dried, first at 100° C. for 10 hours and then at 600° C. for 10 hours. The dried crystals have the following composition expressed in terms of oxide mole ratios:

$Ga_2O_3$:3.6 $SiO_2$:0.99 $Na_2O$

An X-ray diffractogram of the crystals is obtained using a Siemens D-500 X-ray diffractometer with graphite-crystal monochromatized Cu-K alpha radiation. The resultant X-ray powder diffraction pattern is shown in FIG. 2 and the corresponding X-ray powder diffraction data including the calculated d-spacings are set forth in Table 3 below.

TABLE 3
X-Ray Powder Diffraction Data for the Crystalline Galliosilicate of Example 1

| Bragg Angle 2-Theta (Degrees) | Interplanar d-spacings (Angstroms) | Relative Intensity (100 × I/I$_o$) |
|---|---|---|
| 6.099 | 14.4792 | 100.0 |
| 9.998 | 8.8397 | 22.0 |
| 11.740 | 7.5317 | 20.4 |
| 14.208 | 6.2287 | 1.4 |
| 15.466 | 5.7247 | 45.0 |
| 18.479 | 4.7975 | 20.3 |
| 20.138 | 4.4059 | 28.5 |
| 21.059 | 4.2152 | 2.1 |
| 22.547 | 3.9403 | 10.7 |
| 23.390 | 3.8001 | 45.2 |
| 24.735 | 3.5964 | 4.6 |
| 25.505 | 3.4896 | 7.2 |
| 26.753 | 3.3296 | 34.9 |
| 27.476 | 3.2436 | 6.0 |
| 28.615 | 3.1171 | 1.4 |
| 29.322 | 3.0434 | 14.4 |
| 30.418 | 2.9362 | 24.2 |
| 31.059 | 2.8771 | 45.6 |
| 32.105 | 2.7857 | 18.2 |
| 32.721 | 2.7346 | 6.4 |
| 33.720 | 2.6559 | 20.3 |
| 34.305 | 2.6119 | 9.9 |
| 35.271 | 2.5425 | 3.7 |
| 35.843 | 2.5033 | 2.0 |
| 36.758 | 2.4430 | 3.6 |
| 37.462 | 2.3988 | 7.5 |
| 38.903 | 2.3131 | 1.0 |
| 40.102 | 2.2467 | 5.3 |
| 40.538 | 2.2236 | 1.2 |
| 40.963 | 2.2015 | 1.9 |
| 41.453 | 2.1766 | 4.3 |
| 42.267 | 2.1365 | 2.4 |
| 42.778 | 2.1122 | 2.5 |
| 43.555 | 2.0763 | 6.3 |
| 44.027 | 2.0551 | 2.2 |
| 45.290 | 2.0007 | 2.1 |
| 46.639 | 1.9459 | 1.6 |
| 47.254 | 1.9220 | 3.7 |

Figure 2:
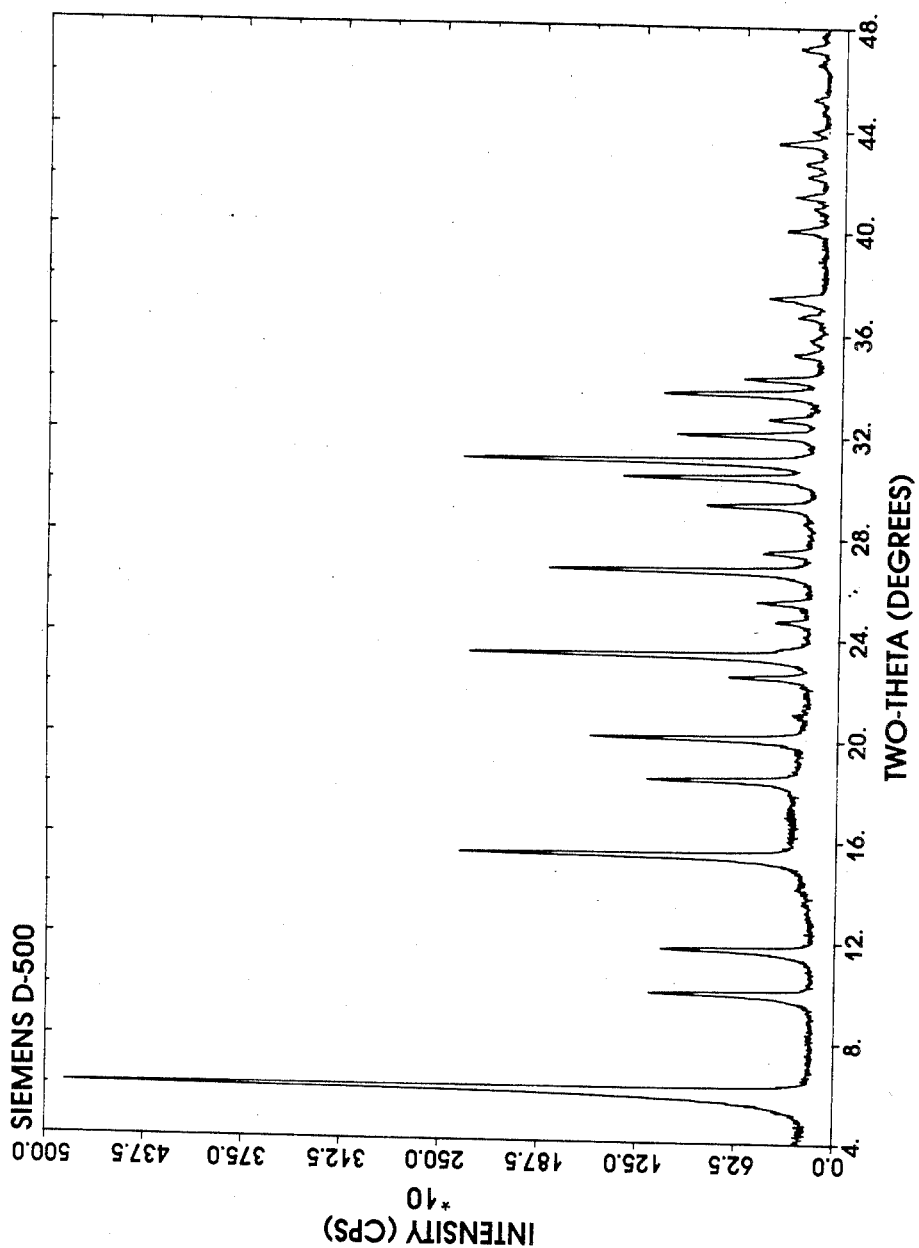
FIG. 2 depicts the X-ray powder diffraction pattern of the molecular sieve synthesized in accordance with the process of Example 1, which process is the process of the invention.

The X-ray powder diffraction pattern set forth in FIG. 2 is substantially similar to that set forth in FIG. 1 for a zeolite with the faujasite structure. Thus, it is oncluded that the crystalline galliosilicate synthesized in Example 1 has the faujasite structure. The d-spacing values set forth in Table 3 for the synthesized galliosilicate are higher than the corresponding values in Table 2 for the zeolite with the faujasite structure. These increases in dspacing values are consistent with a larger unit cell size for the galliosilicate which is attributed to the isomorphous substitution of gallium, which has a larger ionic radius than aluminum, for aluminum in the faujasite structure. Differences in the relative intnsities set forth in Tables 2 and 3 result mainly from the different unit cell composition and crystal size of the two molecular sieves. The unit cell constant $a_o$ for the galliosilicate is 24.918 Angstroms.

The dried crystals produced as described above are exchanged with lanthanum by heating them at about 70° C. for 4 hours in a one molar solution of $LaCl_3$. The crystals are then extensively washed with distilled water and dried. The sodium content of the resultant crystals is found to be 3.76 weight percent, calculated as $Na_2O$, compared to 12.7 weight percent prior to the lanthanum exchange. The crystals contain 13.1 weight percent $La_2O_3$. After calcination in air at 400° C. for 10 hours, the lanthanum exchange procedure described above is repeated. The sodium and lanthanum content of the crystals is now, respectively, 1.23 weight percent, calculated as $Na_2O$, and 18.9 weight percent, calculated as $La_2O_3$. After calcination in air at 600° C. for 10 hours, the lanthanum-exchanged crystals have a BET surface area of about 476 $m^2/g$.

EXAMPLE 2

Figure 3:
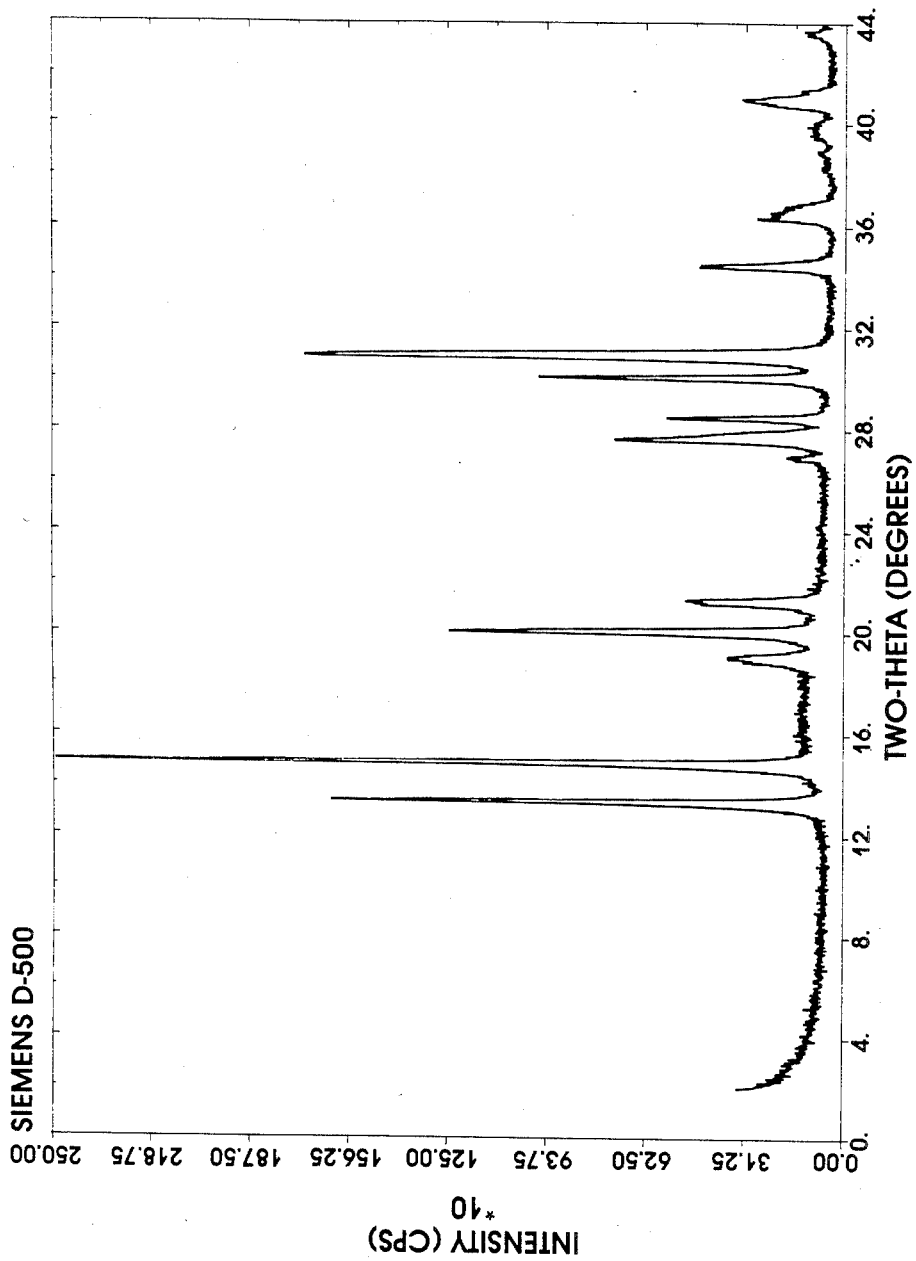
FIG. 3 shows the X-ray powder diffraction pattern of the molecular sieve synthesized in accordance with the process of Example 2.

A mixture of a hydrogel and a galliosilicate solution is prepared as described in Example 1 except, that after the temperature of the mixture is raised to about 95° C., crystallization is allowed to occur while vigorously stirring the mixture. After 48 hours crystallization is completed. An X-ray diffractogram of the resultant crystals is obtained as described in Example 1. The resultant X-ray powder diffraction pattern is set forth in FIG. 3 and the corresponding X-ray powder diffraction data including the calculated d-spacings are set forth in Table 4 below. The X-ray powder diffraction pattern is not characteristic of the faujasite structure but of the natrolite structure. Thus, it is concluded that stirring or agitation during crystallization will result in the formation of a galliosilicate molecular sieve that does not have the faujasite structure.

TABLE 4

X-Ray Powder Diffraction Data for the Crystalline Galliosilicate of Example 2

| Bragg Angle 2-Theta (Degrees) | Interplanar d-spacings (Angstroms) | Relative Intensity (100 × $I/I_o$) |
|---|---|---|
| 3.692 | 23.9084 | 1.5 |
| 12.573 | 7.0346 | 1.5 |
| 13.373 | 6.6153 | 64.7 |
| 14.898 | 5.9413 | 100.0 |
| 18.360 | 4.8281 | 2.2 |
| 19.066 | 4.6508 | 10.7 |
| 20.073 | 4.4198 | 47.7 |
| 21.273 | 4.1731 | 16.4 |
| 26.979 | 3.3021 | 4.9 |
| 27.668 | 3.2213 | 26.9 |
| 28.509 | 3.1282 | 20.1 |
| 30.091 | 2.9673 | 36.2 |
| 30.935 | 2.8881 | 66.9 |
| 34.484 | 2.5986 | 17.5 |
| 36.369 | 2.4682 | 9.9 |
| 36.560 | 2.4557 | 8.1 |

TABLE 4-continued

X-Ray Powder Diffraction Data for the Crystalline Galliosilicate of Example 2

| Bragg Angle 2-Theta (Degrees) | Interplanar d-spacings (Angstroms) | Relative Intensity (100 × $I/I_o$) |
|---|---|---|
| 38.287 | 2.3488 | 1.5 |
| 38.938 | 2.3110 | 1.7 |
| 39.605 | 2.2736 | 1.5 |
| 39.793 | 2.2633 | 1.5 |
| 40.929 | 2.2031 | 12.0 |

EXAMPLE 3

Figure 4:
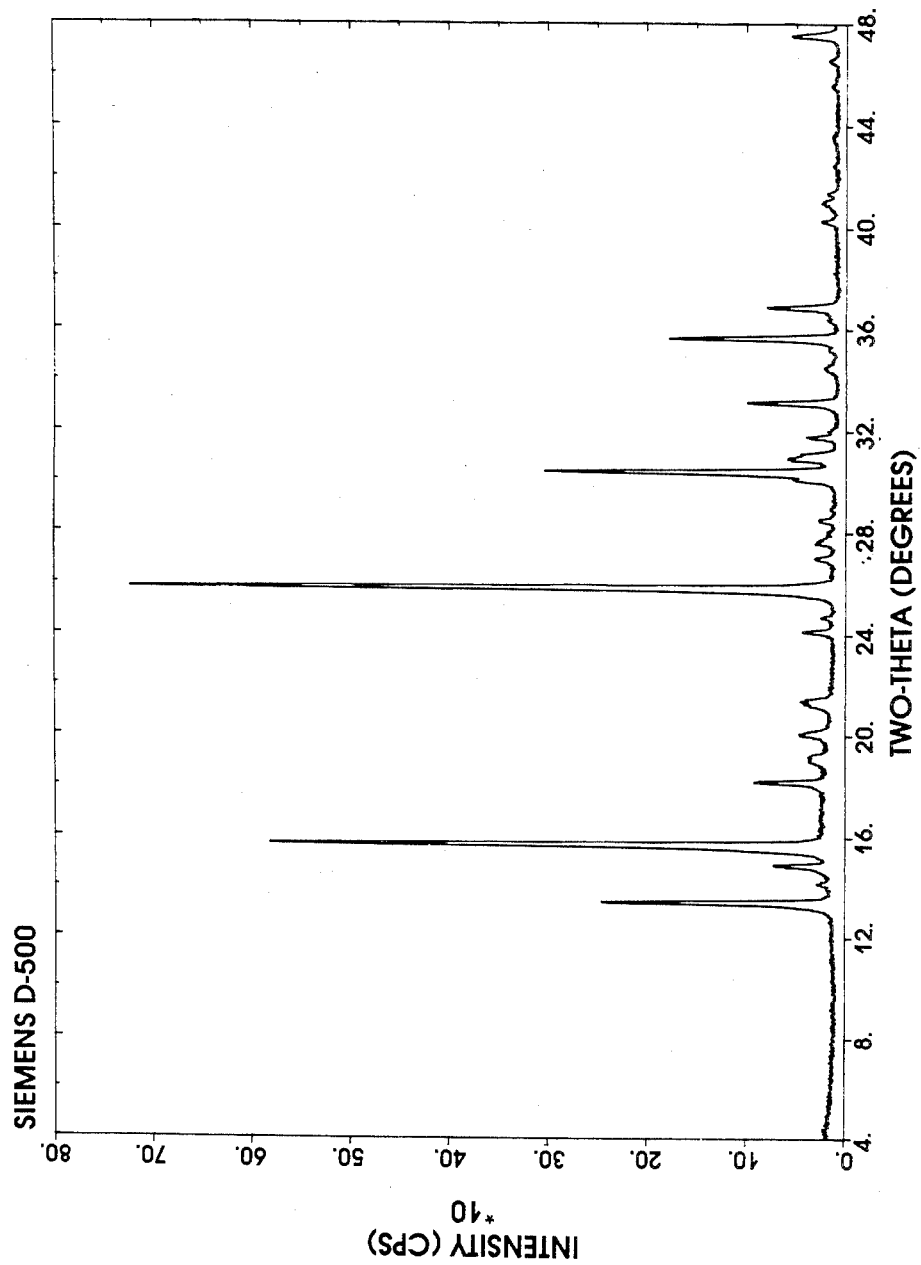
FIG. 4 depicts the X-ray powder diffraction pattern of the molecular sieve synthesized in accordance with the process of Example 3.

A mixture of a hydrogel and a galliosilicate solution is prepared as described in Example 1 except that the temperature of the mixture is raised from 95° C. to 150° C. before the mixture is allowed to crystallize without stirring over a period of 48 hours. An X-ray diffractogram of the resultant crystals is obtained as described in Example 1. The resultant X-ray powder diffraction pattern is set forth in FIG. 4 and the corresponding X-ray powder diffraction data including the calculated d-spacings are set forth in Table 5 below. The X-ray powder diffraction pattern indicates that the crystals have a structure characteristic of analcime with minor amounts of natrolite impurities. It is thus concluded that a crystallization temperature of 150° C. or above will not result in a galliosilicate with the desired faujasite structure.

TABLE 5

X-Ray Powder Diffraction Data for the Crystalline Galliosilicate of Example 3

| Bragg Angle 2-Theta (Degrees) | Interplanar d-spacings (Angstroms) | Relative Intensity (100 × $I/I_o$) |
|---|---|---|
| 13.391 | 6.6066 | 32.2 |
| 14.157 | 6.2512 | 1.8 |
| 14.884 | 5.9473 | 7.3 |
| 15.717 | 5.6338 | 78.6 |
| 18.173 | 4.8776 | 10.1 |
| 19.076 | 4.6486 | 2.6 |
| 20.072 | 4.4202 | 4.1 |
| 21.346 | 4.1591 | 4.4 |
| 24.131 | 3.6851 | 4.3 |
| 24.689 | 3.6031 | 1.9 |
| 25.829 | 3.4465 | 100.0 |
| 27.011 | 3.2984 | 2.8 |
| 27.649 | 3.2237 | 2.3 |
| 28.493 | 3.1301 | 2.2 |
| 30.386 | 2.9393 | 40.2 |
| 30.935 | 2.8883 | 5.8 |
| 31.780 | 2.8134 | 4.2 |
| 33.109 | 2.7035 | 12.9 |
| 34.481 | 2.5990 | 1.9 |
| 35.286 | 2.5416 | 0.6 |
| 35.641 | 2.5170 | 23.4 |
| 36.401 | 2.4662 | 0.8 |
| 36.850 | 2.4372 | 9.7 |
| 38.156 | 2.3567 | 0.7 |
| 40.281 | 2.2372 | 2.1 |
| 41.014 | 2.1988 | 1.7 |
| 41.369 | 2.1808 | 1.2 |
| 42.469 | 2.1268 | 0.8 |
| 43.548 | 2.0766 | 1.0 |
| 45.570 | 1.9890 | 0.9 |
| 46.549 | 1.9495 | 1.3 |
| 47.533 | 1.9114 | 6.4 |

It will apparent from the foregoing that the invention provides a relatively simple method of synthesizing a crystalline, galliosilicate molecular sieve having the faujasite structure. Catalysts containing such a molecular sieve are useful in a variety of chemical conversion processes, particularly hydrocarbon conversion processes such as catalytic cracking, isomerization, and hydrocracking.

Although this invention has been primarily described in conjunction with examples and by reference to embodiments thereof, it is evident that many alternatives, modifications and variations will be apparent to those skilled in the art in light of the foregoing description. Accordingly, it is intended to embrace within the invention all such alternatives, modifications and variations that fall within the spirit and scope of the appended claims.

I claim:

1. A process for preparing a crystalline, galliosilicate molecular sieve having the faujasite structure which comprises:
   (a) mixing a source of gallia, a source of silica, a source of sodium and water to form a hydrogel having the following oxide mole ratios of components
   $SiO_2/Ga_2O_3 = 6$ to 15
   $Na_2O/Ga_2O_3 = 1$ to 5
   $H_2O/Ga_2O_3 = 80$ to 500
   (b) adding to said hydrogel a galliosilicate solution substantially free of alumina and dispersed particles, said solution having the following oxide mole ratios of components
   $SiO_2/Ga_2O_3 = 5$ to 30
   $Na_2O/Ga_2O_3 = 6$ to 20
   $H_2O/Ga_2O_3 = 200$ to 800
   to form a mixture of said solution and said hydrogel, said mixture having oxide mole ratios of components falling within the same ranges as the oxide mole ratios of components in said hydrogel and wherein said solution is prepared by mixing a source of gallia, a source of silica, a source of sodium and water; and
   (c) crystallizing said mixture in the absence of stirring at a temperature below about 150° C. to form a galliosilicate molecular sieve having the faujasite structure and containing less than about 0.2 weight percent alumina.

2. A process as defined by claim 1 wherein said source of gallia comprises gallium oxide.

3. A process as defined by claim 2 wherein said source of sodium comprises sodium hydroxide.

4. A process as defined by claim 3 wherein said source of silica comprises a silica sol.

5. A process as defined by claim 3 wherein step (c) is carried out at a temperature between about 90° C. and about 110° C.

6. A process as defined by claim 4 wherein said ratio of $Na_2O$-to-$Ga_2O_3$ in the solution of step (b) is between about 8 and about 15.

7. A process as defined by claim 1 wherein the hydrogel formed in step (a) has the following oxide mole ratios of components
$SiO_2/Ga_2O_3 = 8$ to 12
$Na_2O/Ga_2O_3 = 1$ to 5
$H_2O/Ga_2O_3 = 100$ to 200.

8. A process as defined by claim 7 wherein the solution of step (b) has the following oxide mole ratios of components
$SiO_2/Ga_2O_3 = 10$ to 20
$Na_2O/Ga_2O_3 = 8$ to 15
$H_2O/Ga_2O_3 = 300$ to 500.

9. A process as defined by claim 1 wherein said galliosilicate molecular sieve having the faujasite structure has the following composition expressed in terms of oxide mole ratios in the anhydrous state $Ga_2O_3:xSiO_2:yNa_2O$ wherein x equals 2.5 to 7 and y is approximately 1.0.

10. A process as defined by claim 9 wherein x equals 3 to 6.

11. A process for preparing a crystalline, galliosilicate molecular sieve having the faujasite structure which comprises: oxide mole
   (a) mixing a hydrogel having the following ratios of components
   $SiO_2/Ga_2O_3 = 6$ to 15
   $Na_2O/Ga_2O_3 = 1$ to 5
   $H_2O/Ga_2O_3 = 80$ to 500
   with a galliosilicate solution substantially free of alumina and dispersed particles, said solution having the following oxide mole ratios of components
   $SiO_2/Ga_2O_3 = 5$ to 30
   $Na_2O/Ga_2O_3 = 6$ to 20
   $H_2O/Ga_2O_3 = 200$ to 800
   to form a mixture of said hydrogel and said solution, said mixture having oxide mole ratios of components falling within the same ranges as the oxide mole ratios of components in said hydrogel;
   (b) crystallizing said mixture at a temperature between about 70° C. and about 150° C. in the absence of stirring to form a galliosilicate molecular sieve having the faujasite structure and containing less than about 0.2 weight percent alumina.

12. A process as defined by claim 11 wherein said hydrogel is formed by dissolving gallium oxide in an aqueous solution of sodium hydroxide and adding a source of silica thereto.

13. A process as defined by claim 12 wherein the galliosilicate solution of step (a) is formed by dissolving gallium oxide in an aqueous solution of sodium hydroxide and adding a source of silica thereto.

14. A process as defined by claim 13 wherein the source of silica used in forming said hydrogel and said solution comprises a silica sol.

15. A process as defined by claim 11 wherein said crystalline molecular sieve having the faujasite structure contains substantially no alumina.

16. A process as defined by claim 11 wherein said mixture is crystallized at a temperature between about 90° C. and about 110° C.

17. A process as defined by claim 11 wherein said mixture is crystallized at a temperature of about 95° C.

18. A process as defined by claim 11 wherein said hydrogel has the following composition expressed in terms of oxide mole ratios $Ga_2O_3:9.44\ SiO_2:3.30\ Na_2O:122\ H_2O$.

19. A process as defined by claim 18 wherein said solution has the following composition expressed in terms of oxide mole ratios $Ga_2O_3:15\ SiO_2:10\ Na_2O:400\ H_2O$.

20. A process as defined by claim 19 wherein said mixture is crystallized at a temperature between about 90° C. and about 110° C.

21. A process for preparing a crystalline, galliosilicate molecular sieve having the faujasite structure which consists essentially of:

(a) mixing a hydrogel having the following oxide mole ratios of components

SiO$_2$/Ga$_2$O$_3$ = 6 to 15
Na$_2$O/Ga$_2$O$_3$ = 1 to 5
H$_2$O/Ga$_2$O$_3$ = 80 to 500 with a galliosilicate solution substantially free of alumina and dispersed particles, said solution having the following oxide mole ratios of components SiO$_2$/Ga$_2$O$_3$ = 5 to 30
Na$_2$O/Ga$_2$O$_3$ = 6 to 20
H$_2$O/Ga$_2$O$_3$ = 200 to 800 to form a mixture of said hydrogel and said solution, said mixture having oxide mole ratios of components falling within the same ranges as the oxide mole ratios of components in said hydrogel; and (b) crystallizing said mixture at a temperature between about 70° C. and about 150° C. in the absence of stirring to form a galliosilicate molecular sieve having the faujasite structure and containing less than about 0.2 weight percent alumina.

22. A process as defined by claim 1 wherein said crystalline molecular sieve having the faujasite structure contains substantially no alumina.

23. A process as defined by claim 21 wherein said crystalline molecular sieve having the faujasite structure contains substantially no alumina.

* * * * *

UNITED STATES PATENT AND TRADEMARK OFFICE
CERTIFICATE OF CORRECTION

PATENT NO. : 4,803,060

DATED : February 7, 1989

INVENTOR(S) : Mario L. Occelli

It is certified that error appears in the above-identified patent and that said Letters Patent is hereby corrected as shown below:

Column 14:

Claim 11, line 13, delete "oxide mole"; line 14, after "following" insert --oxide mole--.

Signed and Sealed this

Sixth Day of July, 1993

Attest:

MICHAEL K. KIRK

Attesting Officer    Acting Commissioner of Patents and Trademarks